United States Patent [19]

Noren

[11] 4,317,514
[45] Mar. 2, 1982

[54] TRAY LOCK CONVEYOR FOR DISHWASHING MACHINES

[76] Inventor: Tore H. Noren, P.O. Box 219, Petaluma, Calif. 94952

[21] Appl. No.: 137,571

[22] Filed: Apr. 7, 1980

[51] Int. Cl.³ ............................................. B65G 49/02
[52] U.S. Cl. .................................... 198/649; 134/72; 134/128; 211/41
[58] Field of Search ................. 198/649, 650; 134/72, 134/124, 128, 131; 211/41

[56] References Cited

U.S. PATENT DOCUMENTS

| | | | |
|---|---|---|---|
| 2,667,262 | 1/1954 | Davis | 198/649 |
| 2,840,227 | 6/1958 | Federighi et al. | 198/649 |
| 2,884,935 | 5/1959 | Fox | 198/649 X |
| 3,084,702 | 4/1963 | Nasser | 211/41 |
| 3,166,183 | 1/1965 | Cumming | 198/649 X |
| 3,206,005 | 9/1965 | Lyman | 198/649 X |

*Primary Examiner*—Jeffrey V. Nase
*Attorney, Agent, or Firm*—Alvin E. Hendricson

[57] ABSTRACT

An improved peg structure of an endless belt conveyor grips trays to prevent dislodgement during high speed passage through washing and rinsing stations as in a flight dishwashing system.

1 Claim, 4 Drawing Figures

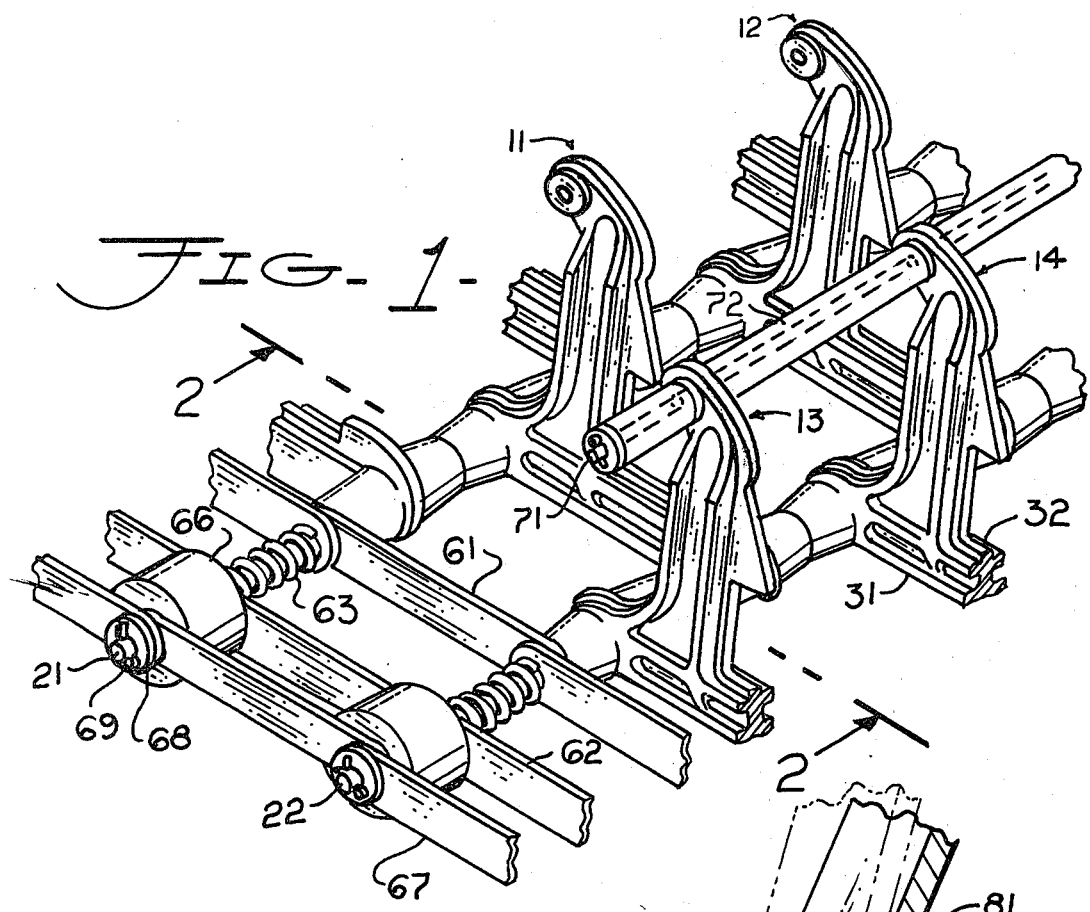
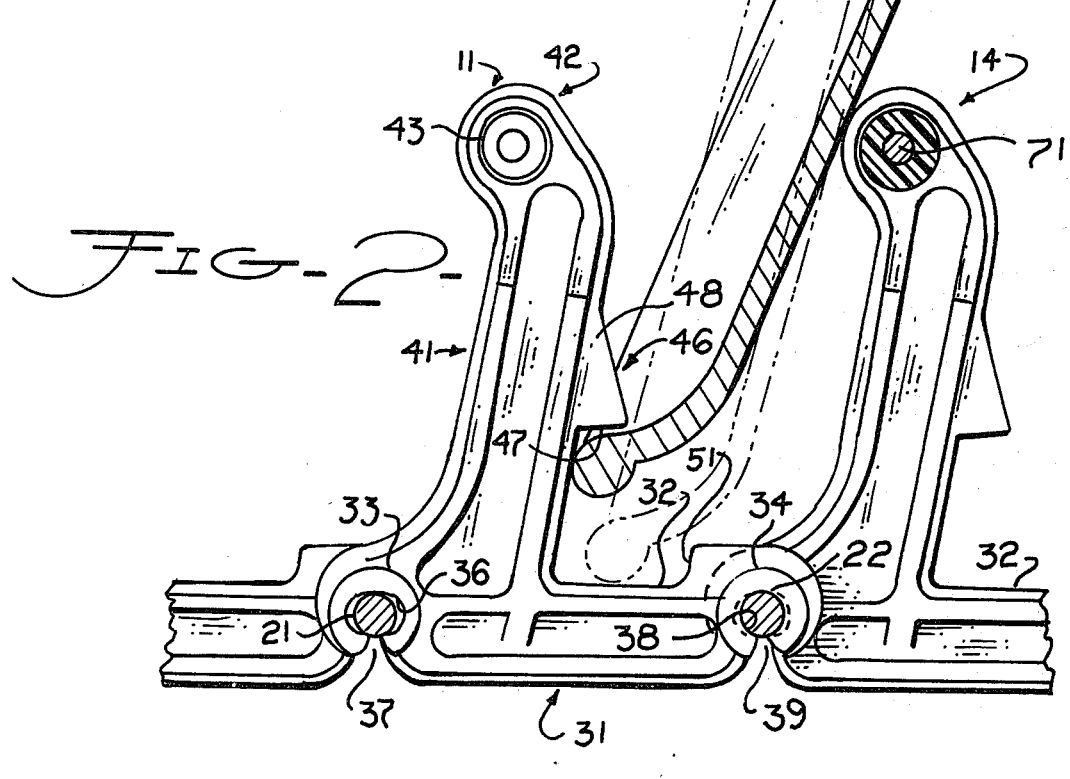

TRAY LOCK CONVEYOR FOR DISHWASHING MACHINES

BACKGROUND OF THE INVENTION

Commercial dishwashing machines adapted to handle a large volume of wares in a short period of time conventionally move the dishes and the like through successive stations whereat individual functions such as washing, rinsing, etc. are performed. This movement may be accomplished with an endless belt conveyor which, moreover, may be adapted to retain and transport individual dishes, trays, or baskets carrying dishes or silverware.

Various problems of conveyors for high speed or "flight" systems have been solved in the prior art and in this respect reference is made to U.S. Pat. No. 2,840,227, for example. The foregoing patent illustrates a peg-type conveyor which has proven to be highly advantageous. Dishes or the like are readily inserted and removed and are retained in proper position for washing, rinsing, etc.

One difficulty that has been experienced with high speed dishwasher systems is the possibility of trays becoming dislodged. This of course must be avoided for at least incomplete processing would occur and the conveyor may even become blocked. Substantial forces may be applied to trays by water forceably sprayed onto the large areas thereof and also trays with deep depressions may require some limited repositioning during spraying in order to maximize spray utilization.

The present invention provides an improved peg-type conveyor for dishwashers which is particularly adapted to retain trays thereon and which accommodates limited tray movement during dishwasher operation.

SUMMARY OF INVENTION

The present invention provides an improved endless belt conveyor for dishwashing machines having a tray lock peg system for retaining trays thereon. A single peg link is herein provided in a multilink conveyor with all links being alike and each peg having a tray lock on the trailing edge thereof for engaging the lip of a tray to limit tray displacement during conveyor movement and spraying of the trays.

Each link of the conveyor hereof has a central body portion carrying a single upright peg and transverse front and rear bearing cylinders through which transverse conveyor rods extend. The peg of each link is slightly inclined with respect to vertical and has an enlarged head adapted to engage the undersurface of a tray. The pegs of successive lateral rows of links are alternated and the spacing between pegs of successive rows longitudinally of the conveyor is dimensioned to readily accommodate a tray disposed generally vertically therebetween. Each peg has a rearward projection of the trailing edge thereof in spaced relation above the body of the link carrying the peg, with such projection having a generally horizontal undersurface and an upper surface that is inclined upwardly and forwardly of the peg. Strengthening ribs on the peg and I-beam configuration of the body provide each link with the structural strength to withstand forces applied thereto over long term dishwashing operations.

DESCRIPTION OF FIGURES

The present invention is illustrated as to a single preferred embodiment in the accompanying drawings, wherein:

FIG. 1 is a partial perspective view of a conveyor in accordance with the present invention;

FIG. 2 is a partial vertical sectional view taken longitudinally of the conveyor in the plane 2—2 of FIG. 1;

DESCRIPTION OF PREFERRED EMBODIMENT

Figure 3:
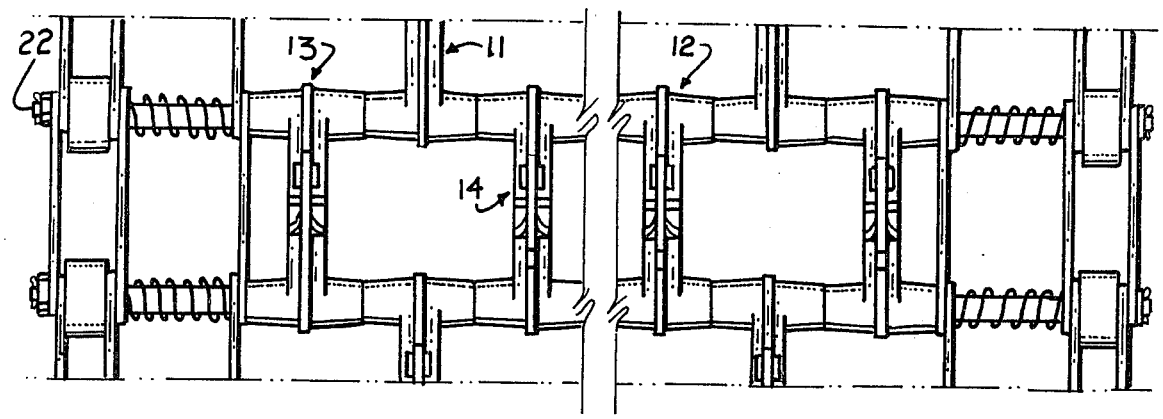
FIG. 3 is a partial plan view of the conveyor of FIG. 1.

The improved conveyor of the present invention includes a plurality of identical links 11, 12, 13, 14, etc., as shown in FIG. 1, mounted on successive transverse conveyor rods 21, 22, etc. Overall assembly of the conveyor may be similar to that of the above-noted U.S. Pat. No. 2,840,227 and is further described below.

Considering now the structure of individual links of the conveyor and referring to FIGS. 1 and 2 of the drawings, it will be seen that each link includes a lower longitudinal body portion 31 resembling an I-beam in cross-section with a central longitudinal rib 32 extending along the top thereof. Transversely across the front and rear of each body portion 31 there are provided bearings 33 and 34 respectively. As will be seen from FIG. 1, these bearings are provided as generally cylindrical transverse elements through which the conveyor rods extend and which are shown to be provided as frusto-conical elements joined at their bases. The forward bearing 33 is shown in FIG. 2 to have an oval shaped opening or bore 36 longitudinally therethrough with a rod release slot 37 on the underside thereof. This rod release slot tapers inwardly to the bore so as to present a relatively sharp shoulder along each edge thereof whereby the link may be pressed downwardly onto the rod 21 to force the rod through the slot 37 into the bore. Similarly, the link may be removed from the rod by deflecting the edges of the rod release slot 37 outwardly. The oval configuration of the bore 36 accommodates longitudinal variation in position of the link as may result from temperature changes further noted below.

The rear bearing 34 is provided with a circular bore 38 therethrough with a rod release slot 39 along the underside thereof. A transverse conveyor rod 22 is disposed through the bore 38 and the link may be removed from the rod by expanding the slot 39 at the narrow edges of the bearing bordering same. The rod 22 fits the bore 38 and thus any longitudinal expansion or contraction of the link body 31 will be accommodated by the oval or oblong configuration of the forward bore 36 in the front bearing 33.

There is provided on each link a single upstanding peg 41. This peg has a generally I-shaped cross section with the front thereof curving about the top and front of the forward bearing 33 and the front and back portions tapering inwardly at an upper peg portion or head 42 inclined upwardly and forwardly of the generally vertical portion. This generally vertical portion is, in fact, inclined slightly toward the rear of the link from the bottom upward and is apertured at the top or head 42 to receive a centrally apertured cylindrical bearing 43 of plastic or heat resistant rubber.

The strengthening rib 32 on the body 31 of the link extends up the back, over the top and down the front of the peg 41 and is expanded on the back of the peg to form a tray-lock 46. This tray lock 46 includes a generally horizontal shoulder 47 extending rearwardly of the peg 41 about one-third of the height thereof above the body 31 and an inclined surface 48 extending upwardly and forwardly of the outer edge of the shoulder 47 back into the rib 32 on the peg. The rib or web 32 is also expanded near the rear of the body 31 to extend upwardly as a vertical shoulder 51 at the head of the rear bearing 34 and from there extends rearwardly about the top of the bearing and curves down about the rear thereof. In order to reduce localized stresses in the link, all junctions of discontinuous surfaces are fileted and it is also noted that the rear cross portion of the peg extends in tapered engagement with the web of the body 31. The links of the present invention may be formed of a metal such as stainless steel or may be injection molded of plastic having high-impact strength and good heat resistant properties.

The links 11 of the present invention are mounted upon conveyor rods 21 to form an endless conveyor belt adapted to extend through a dishwashing machine. Considering, for example, the peg link 11, it will be noted that a rod 21 extends through the forward bearing 33 and a rod 22 extends through the rear bearing 34. At each side of the conveyor belt there are provided flat inner links 61 having the same length as a peg link with an opening at each end to accommodate passage of the conveyor rods. Laterally outward from the link 61 there are provided intermediate links 62 of like configuration and a spring 63 is disposed about each conveyor rod between the sets of links 61 and 62. Laterally outward from the link 62 there are provided rollers 66 disposed one at each end of each rod 21 for riding in rails of the dishwashing machine and these rollers are retained on the rods by outer links 67 which may be the same as the above-described links with washers 68 and cotter pins 69 securing the outer links to the rods. The springs 62 are compressed during assembly of the conveyor belt and the particular arrangement illustrated and described accommodates lateral expansion and contraction of the conveyor belt in passage through warmer and cooler regions of the dishwashing machine.

Figure 4:
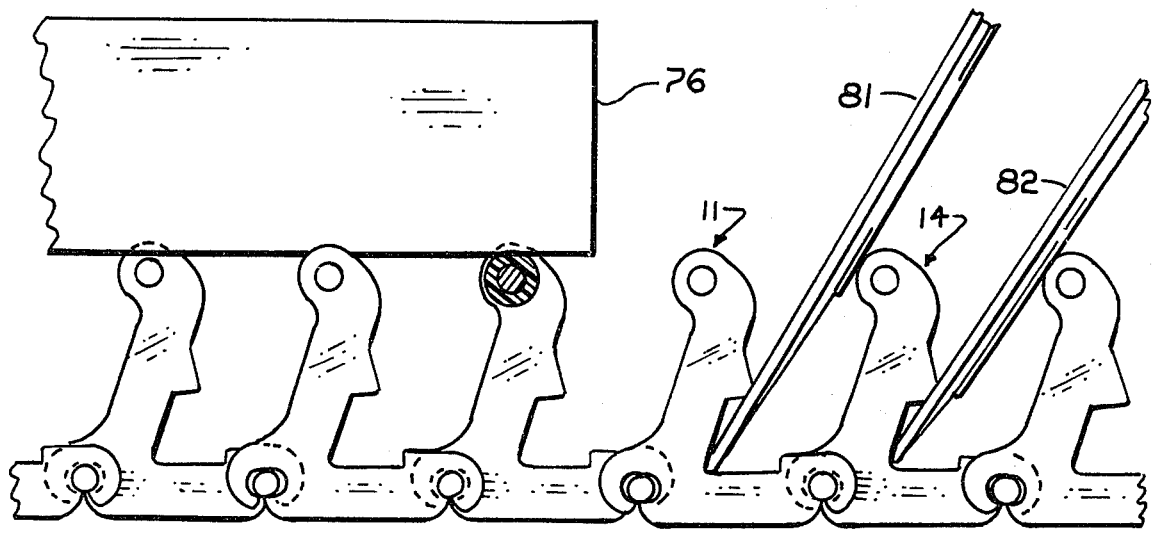
FIG. 4 is a partial representation of a conveyor in accordance herewith carrying wares other than trays.

There are additionally provided upper bars 71 which extend through the bearings 43 in the heads 42 of the tray lock pegs and these bars 71 are preferrably covered with cylindrical sections 72 between the pegs and formed, for example, of tough, heat resistant plastic. The bars 71 may be secured in position by cotter pins and washers and are provided for the purpose of supporting dishwashing trays 76 as indicated in FIG. 4. It is only necessary to provide the transverse bars 71 in spaced lateral rows of tray pegs inasmuch as dishwashing baskets 76 normally have a substantial extent longitudinally of the conveyor belt.

The present invention is particularly adapted to contain and retain trays 81 as well as dishes 82 for carrying same to the successive regions of a flight dishwashing machine. It will be appreciated that wares carried through such a dishwashing machine are subjected to forceable sprays of water which in some instances include detergents and other chemicals for particular purposes known in the art. Such sprays of water may tend to dislodge or displace items carried by the conveyor belt. In this respect, reference is made to FIG. 2 of the drawings wherein a tray 81 is shown to be disposed between tray pegs 11 and 14 of the conveyor belt in accordance with the present invention. As a spray of water is directed onto the forward or inner surface of the tray 81, it will tend to raise the tray upwardly away from the conveyor belt. As this action occurs, the lower edge of the tray will engage the horizontal shoulder 47 on the tray lock 46 while the back or undersurface of the tray is engaging the head 42 of the following peg 14. The tray 81 will thus be seen to be firmly locked between the pegs 11 and 14 so that the tray cannot become dislodged or moved out of engagement with the pegs. Normal tray position is illustrated in part in phantom in FIG. 2 wherein it will be seen that the lower edge or lip of the tray fits or rests on the rib 32 of the peg body ahead of the vertical shoulder 51 thereon. The tray will thus be normally properly positioned between the pegs when inserted or placed on the conveyor, and will be retained during washing and rinsing wherein relatively rapid movement of the conveyor belt may occur and forceable spraying of the tray will occur.

It will be seen that the present invention provides an improvement in dishwashing machines for positively engaging and retaining trays upon the conveyor belt for movement through the machine. The invention is also adapted to convey baskets which may be employed to hold cups, glasses, silverware or the like and also to convey dishes which may be positioned much in the same manner as trays. A particular advantage, however, is the locking action of the present invention to retain trays on the row during dishwashing or rinsing operations. Furthermore, the movement of the tray afforded by the locking mechanism of the present invention is desireable in properly positioning the tray for complete cleaning and rinsing.

Although the present invention has been described above with respect to a single preferred embodiment thereof it will be appreciated that variations and modifications are possible within the scope of the present invention and thus it is not intended to limit the invention to the precise details of illustration of terms of description.

What is claimed is:

1. In an endless conveyor belt moving wares such as trays through a dishwashing machine, a plurality of peg links disposed on transverse rods with each link having a longitudinal body portion and a single upstanding peg with a front and back side and a tray lock on the back side of said peg including a projection having a substantially horizontal undersurface disposed in spaced relation above said body portion, each of said peg links having front and rear transverse bearings for mounting upon transverse rods of said conveyor belt with said body portion extending between said bearings and said peg extending upwardly from said body adjacent said front bearing, and said body having a short upstanding shoulder adjacent said rear bearing below said tray lock projection to define with said peg an area for engagement by an edge of a tray or the like disposed between said peg and like pegs on peg links in a row behind said peg link.

* * * * *